United States Patent [19]

Sartelet et al.

[11] Patent Number: 5,338,767
[45] Date of Patent: Aug. 16, 1994

[54] THIXOTROPIC POLYURETHANE SYSTEMS

[75] Inventors: Jean-Francois Sartelet, Verzy; Francois R. Sanch, Chalons sur Marne, both of France; Zissis Aggias, Duesseldorf, Fed. Rep. of Germany

[73] Assignee: Henkel Kommanditgesellschaft auf Aktien, Duesseldorf, Fed. Rep. of Germany

[21] Appl. No.: 969,814

[22] PCT Filed: Jul. 10, 1991

[86] PCT No.: PCT/EP91/01284
§ 371 Date: Mar. 19, 1993
§ 102(e) Date: Mar. 19, 1993

[87] PCT Pub. No.: WO92/01725
PCT Pub. Date: Feb. 6, 1992

[30] Foreign Application Priority Data
Jul. 19, 1990 [DE] Fed. Rep. of Germany ....... 4023005

[51] Int. Cl.⁵ ............................................ C08G 18/14
[52] U.S. Cl. ..................... 521/159; 521/163; 521/166; 528/59; 528/60; 528/61; 528/62; 528/73; 528/74.5
[58] Field of Search ............ 521/159, 163, 166; 528/59, 60, 61, 62, 73, 74.5

[56] References Cited

FOREIGN PATENT DOCUMENTS 0248254 12/1987 European Pat. Off. .
0354471  2/1990 European Pat. Off. .
2351186  4/1975 Fed. Rep. of Germany .
3827378  2/1990 Fed. Rep. of Germany .
2282437  8/1925 France .

*Primary Examiner*—Maurice J. Welsh
*Attorney, Agent, or Firm*—Ernest G. Szoke; Wayne C. Jaeschke; John E. Drach

[57] ABSTRACT

Thixotropic polyurethane systems based on a polyol component and an isocyanate component, the polyol component containing a mixture of polyamidoamine and low molecular weight, polyfunctional amines, more particularly aromatic amines, which are suitable in particular as adhesive systems for special applications.

23 Claims, No Drawings

THIXOTROPIC POLYURETHANE SYSTEMS

BACKGROUND OF THE INVENTION

1. Field of the Invention

This invention relates to thixotropic polyurethane systems, to their production and to their use.

2. Statement of Related Art

In many applications of polyurethane systems, particularly in the field of adhesives, it is desirable that the systems show pseudoplastic to thixotropic behavior so that, after application, a high viscosity is rapidly established and the coating applied is prevented from running.

The present invention relates in particular to special two-component adhesive systems of the polyurethane type which may be used above all in the manufacture of filters, in the fitting of glass in window profiles, particularly for multiple glazing, and in the production of sandwich elements, for example truck superstructures.

In these applications in particular, it is desirable that the adhesive system should not flow because it often has to be applied to overhead or vertical surfaces. Paste-form, filled adhesives which may additionally contain inorganic and/or organic thickeners have hitherto been used for this purpose. In the case of two-component systems, it is generally the polyol component which filled, more particularly with fillers for physical thixotropicizing, inorganic fillers, such as layer silicates, mostly being used.

Paste-form, physically thixotropicized adhesive systems of this type do not flow and although this may be desirable for actual assembly, it is undesirable so far as application of the adhesive is concerned. On the one hand, it makes application by machine difficult, if not impossible; on the other hand, these adhesives do not run on the surface of the substrate with the result that the wetting required is not obtained unless additional measures are taken. In addition, mixing of the filled polyol component with the isocyanate component immediately before application of the adhesive is complicated to a considerable extent.

The problem addressed by the present invention was to provide two-component thixotropic polyurethane systems which would be particularly suitable for the stated applications and which would not be attended by any of the above-mentioned disadvantages, but instead would still have the relatively low viscosity required for application for a few seconds after mixing of the components and in which the thixotropic consistency would only be established after that time; in addition, the typical requirements of a corresponding adhesive system would be satisfied.

It has surprisingly been found that two-component polyurethane systems of the type in question can be obtained if the polyol component contains a mixture of polyamidomines with a low molecular weight polyfunctional amine. Other advantageous embodiments of the invention, which also relate to the production and use of the thixotropic polyurethane systems according to the invention, are disclosed in claims 2 to 16.

DESCRIPTION OF THE INVENTION

According to the invention, it has been found that the mixture of polyol and isocyanate component according to the invention still has a sufficiently low viscosity for application for about 4 to about 60 seconds so that 1) the substrate is thoroughly wetted and
2) the adhesive runs to a certain extent;

surprisingly, the thixotropic effect is then effectively developed so that the system shows hardly any flow behavior with the result that the adhesive remains in place without running or dripping, even on vertical substrate surfaces. This thixotropic effect is independent of the actual pot life of the adhesive composition according to the invention which can be adjusted in known manner to times of about 1 minute to about 5 hours.

The invention is equally applicable to two-component polyurethane systems in the form of foams, elastomers or sealing compounds.

At the same time, the polyol components modified in accordance with the invention have a storage life of one year and longer.

Finally, it has been found that it is possible in accordance with the invention to establish bonds of which the tensile shear strength is surprisingly about 30% higher than that of comparable adhesive systems which have not been chemically thixotropicized in accordance with the invention.

At the same time, it was found that neither an adequate storage life nor an adequate thixotropic effect after mixing with the isocyanate component is established if only polyamidoamine or only a low molecular weight polyfunctional amine is added to the polyol component.

Particularly suitable polyamidoamines for addition to the polyol components are those obtainable by reaction of oligomerized fatty acids, such as tricarboxylic acids, with an excess of polyfunctional amines. A plasticized polyamidoamine resin based on oligomerized unsaturated fatty acids which has an average molecular weight of approx. 1,200 and which corresponds to the average composition $C_{72}H_{150}N_9O_3$ for a viscosity of approximately 3,000 P at 25° C. has proved to particularly suitable.

These resins are obtained by condensation or amidation of (a) oligocarboxylic acids from the oligomerization of unsaturated fatty acids preferably having a trimer content of at least 50% by weight for a preferred composition of 0 to 2% monomeric fatty acids, 10 to 50% dimeric fatty acids and 50 to 90% trimeric fatty acids with (b) an excess of a heterocyclic amine corresponding to the following general formula

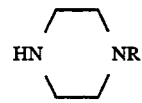

in which R is an alkylamino group or H, $-R'NH_2$, where R' is a saturated aliphatic hydrocarbon chain, preferably a $-C_2H_4$ group.

Particularly suitable polyfunctional amines are those which contain on average approximately 2 amino groups per molecule. Other polyfunctional amines suitable for use in accordance with the invention are cycloaliphatic (di)amines and (di)amines based on polyethers, such as polyoxypropylene $\alpha,\omega$-diamine, and also liquid aromatic (di)amines.

Suitable aromatic diamines include 2,4-diaminomesitylene, 1,3,5-triethyl-2,4-diaminobenzene, 1,3,5-triisopropyl-2,4-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane,3,5-diethyl-3,'5'-diisopropyl-4,4'-diaminodiphenyl methane, 1-t-butyl-3,5-dimethyl-2,4-diaminobenzene, 1-t-butyl-3,5-dimethyl-2,6-diaminobenzene or technical mixtures thereof and, optionally, isomers thereof, even in admixture. Preferred diamines are trialkyl-substituted diaminobenzenes, optionally in the form of their isomer mixtures, in which the alkyl groups are preferably one methyl group and two ethyl groups, for example 1-methyl-3,5-diethyl-2,4-diaminobenzene and 1-methyl-3,5-diethyl-2,6-diaminobenzene.

The amino compounds mentioned above may also be used in the form of liquid preparations together with other components. Components such as these may be, for example, esters and/or oligomerized or polymerized esters, optionally containing NCO-reactive hydroxyl groups. Examples of such esters are, for example, carbonates and polycarbonates, more particularly propylene-1,2-carbonate. One third to one half of the amine preparations suitable for use in accordance with the invention typically consist of such esters. Preparations of the type in question are also commercially available, for example under the name Baytec 110 from Bayer AG.

However, good results can also be obtained with tetramethyl ethylenediamine and with representatives of the homologous series of alkanolamines providing the compounds mentioned are liquid at room temperature.

Polyols suitable for use in accordance with the invention include the polyols known per se for two-component polyurethane systems of the type described, for example, in DE 38 27 378 and EP 354 471, preferred polyol components being used in the following Examples. Preferred polyols are polyesters, polyacetals, polyethers, polythioethers, polyamides and/or polyester amides containing on average 2 to 4 hydroxyl groups.

Suitable polyethers are, for example, the polymerization products of ethylene oxide, propylene oxide, butylene oxide and copolymerization or graft polymerization products thereof and the polyethers obtained by condensation of polyhydric alcohols or mixtures thereof and the polyethers obtained by alkoxylation of polyhydric alcohols, amines, polyamines and aminoalcohols. Isotactic polypropylene glycol may also be used.

Suitable polyacetals are, for example, the compounds obtainable from glycols, such as diethylene glycol, triethylene glycol, hexanediol and formaldehyde. Suitable polyacetals can also be obtained by polymerization of cyclic acetals.

Among the polythioethers, the self-condensates of thiodiglycol and/or the condensates of thiodiglycol with other glycols, dicarboxylic acids, formaldehyde, aminocarboxylic acids or aminoalcohols are mentioned in particular. Depending on the co-components, the products in question are polythioethers, polythio mixed ethers, polythioether esters, polythioether ester amides. Polyhydroxyl compounds such as these may also be used in alkylated form or in admixture with alkylating agents.

The polyesters, polyester amides and polyamides include the predominantly linear condensates obtained from. polybasic, saturated and unsaturated carboxylic acids or anhydrides and polyhydric, saturated and unsaturated alcohols, aminoalcohols, diamines, polyamines and mixtures thereof, and also polyterephthalates or polycarbonates for example. Polyesters of lactones, for example caprolactone, or of hydroxycarboxylic acids may also be used. The polyesters may be terminated by hydroxyl or carboxyl groups. Relatively high molecular weight polymers or condensates, such as for example polyethers, polyacetals, polyoxymethylenes, may also be used as alcohol component in their synthesis.

Polyhydroxyl compounds already containing urethane or urea groups and optionally modified natural polyols, such as castor oil, may also be used. Basically, polyhydroxyl compounds containing basic nitrogen atoms, for example polyalkoxylated primary amines or polyesters, or polythioethers containing co-condensed alkyl diethanolamine may also be used. Polyols obtainable by complete or partial ring opening of epoxidized triglycerides with primary or secondary hydroxyl compounds, for example the reaction product of epoxidized soybean oil with methanol, are also suitable.

Solids which do not act as physical thixotropicizing agents, but perform other functions, for example drying agents, pigments, extenders, dispersion aids, may also be incorporated in the polyol component. Examples of such solids are chalk, heavy spar, talcum and magnesium/calcium carbonate double salts.

Suitable isocyanate components are those which are also known per se for use in two-component polyurethane systems and which are described, for example, in DE 38 27 378. Thus, virtually any liquid polyfunctional isocyanates, more particularly crude MDI (industrially produced 4,4'-diphenyl methane diisocyanate) having a functionality of 2.4 to 2.7 and also tolylene diisocyanate (TDI), tetramethyl xylene diisocyanate (TMXDI) and/or isophorone diisocyanate (IDPI), are suitable.

The ratio of low molecular weight polyfunctional amines to polyamidoamine is from about 10:1 to 2:3 parts by weight. Although this ratio does not appear to be overly critical, ratios by weight of approximately 2:1 to 4:1 are preferred for the methyl diethyl diaminobenzenes mentioned.

The percentage content of the amine combination in the polyol component is from 1 to 10% by weight, preferably from 2 to 6% by weight and more preferably from 3 to 5% by weight.

The polyfunctional amines and the polyamidoamine are preferably added to the polyol component before the reaction with the isocyanate component. The polyol component together with the additives according to the invention is normally mixed thoroughly with the isocyanate component immediately before application.

The polyol component suitable for use in accordance with the invention contains:

| | |
|---|---|
| 5 to 100% by weight | polyol |
| 0 to 85% by weight | filler |
| 0 to 5% by weight | drying agent, such as zeolite thickener |
| 0 to 2% by weight | (also for preventing sedimentation) |
| 0 to 2% by weight | other auxiliaries, such as for example dyes or catalysts |
| 1 to 10% by weight | and more particularly 3 to 5% by weight thixotropicizing agent according to the invention. |

According to the invention, the most suitable ratio of polyol component to isocyanate component is best expressed by the stoichiometric ratio of NCO reactive groups to NCQ groups. This ratio is in the range from 3:2 to 2:3 and more particularly in the range from 1:1 to 3:4. An excess of NCO groups of approximately 10 to 30% is optimal.

The invention is illustrated by the following Examples in which all percentages and parts are by weight.

EXAMPLE 1

| | |
|---|---|
| 23% | castor oil |
| 23% | polyether triol; propoxylated glycerol having a molecular weight of approximately 450 |
| 4% | zeolite paste (as in Example 1) |
| 0.2% | layer silicate (in the small quantity added, the layer silicate does not act as a thixotropicizing agent, but instead as a dispersion aid) |
| 2.6% | Baytec 110 |
| 0.9% | polyamidoamine resin based on oligomerized unsaturated fatty acids (see page 4, top) |
| 0.02% | dibutyl tin dilaurate |
| 46.28% | chalk |

The ratio in which these polyurethane components according to the invention are mixed with crude MDI is 3:1 parts by weight. The thixotropic effect is developed after 12 seconds at 25° C. The pot life at 20° C. is 6 minutes.

The tensile shear strength of an aluminium-to-aluminium bond according to DIN 53 283 measured 12–15 N/mm².

EXAMPLE 2

| | |
|---|---|
| 41.7% | polyether triol; propoxylated glycerol having a molecular weight of approximately 450. |
| 42.4% | castor oil |
| 5.75% | zeolite paste (as in Example 1) |
| 0.025% | dibutyl tin dilaurate |
| 0.3% | layer silicate (in the small quantity added, the layer silicate does not act as a thixotropicizing agent, but instead as a dispersion aid) |
| 4% | titanium dioxide |
| 4.5% | Baytec 110 |
| 1.5% | polyamidoamine resin based on oligomerized unsaturated fatty acids (as in Example 1). |

The ratio in which these polyurethane components according to the invention are mixed with crude MDI is 100:62.5 parts by weight. The thixotropic effect is developed after 12 seconds at 25° C.. The pot life at 20° C. is 3 minutes.

The tensile shear strength of an aluminium-to-aluminium bond according to DIN 53 283 measured 10–15 N/mm².

EXAMPLE 3

The following formulation has proved to be particularly suitable in the manufacture of double-glazed windows, i.e. for bonding the glass to the window profiles:

| | |
|---|---|
| 48 parts by weight | castor oil |
| 4 parts by weight | drying agent (50% zeolite paste) (as in Example 1) |
| 48 parts by weight | filler (chalk) |
| 0.5 part by weight | polyamidoamine (polyamidoamine resin based on oligomerized unsaturated fatty acids) (as in Example 1) |
| 4 parts by weight | Baytec 110 |
| 0.13 part by weight | catalyst (dibutyl tin dilaurate) (DBTL) |

The above-mentioned mixture forms the polyol component and, for application, is mixed with crude MDI in a ratio of 4:1. The thixotropic effect is developed after about 15 seconds, the pot life is 30 seconds and the setting time is about 1 to 1.5 minutes.

In addition, a number of polyurethane systems containing various amounts of the combination according to the invention of polyfunctional amines and polyamidoamine were tested for their flow behavior after application to a horizontal surface as the criterion for evaluating the thixotropy of these systems. The test results are shown in the following Tables.

The basic product tested according to Tables 2 and 5 consisted of castor oil/polyether triol mixed in a ratio of 43% by weight/42% by weight, the polyether triol (propoxylated glycerol, average molecular weight approx. 450) corresponding to Example 2.

Table 1 below shows the properties of polyurethane systems in which only the percentage by weight of polyamidoamine resin was varied:

TABLE 1

| % By weight Baytec 110 | 2.25 | 2.25 | 2.25 | 2.25 | 2.25 | 2.25 | 2.25 | 2.25 |
|---|---|---|---|---|---|---|---|---|
| % By weight polyamidoamine resin | 0.5 | 1 | 1.5 | 2 | 2.5 | 3 | 3.5 | 4 |
| % By weight DBTL*** | 0.01 | 0.01 | 0.01 | 0.01 | 0.01 | 0.01 | 0.01 | 0.01 |
| Pseudoplasticity after (seconds) | 20–25 | 20 | 15–20 | 15–20 | 15–20 | 13–15 | 10–15 | 10 |
| Consistency | Gel, no consistency | Gel, no consistency | Consistent gel, no lumps | Gel, no lumps | Gel, no lumps | Gel, lumps | Lumps | Lumps |
| Tendency to run on a vertical surface | Yes | Yes | Yes | Yes | Yes | Yes | Yes | Yes |
| Distance (cm) | >50 | >50 | >30 | 15 | 10 | 5 | 2 | 2 |

Polyurethane layer thickness: 5 mm
Basic material:
castor oil/polyether triol (from the propoxylation of glycerol), average MW ~450: 43/42 parts by weight
Basic material/catalyst (crude MDI) = 100 pbw/60 pbw (parts by weight)
***Dibutyl tin dilaurate Further tests were conducted to determine in what way the addition of polyamidoamine resin based on oligomerized unsaturated fatty acids with no addition of aromatic diamines affects the rheological behavior of a polyurethane system.

TABLE 2

| % Polyamidoamine based on oligomerized unsaturated fatty acids (see page 4) | Aromatic diamine | Flow behavior |
|---|---|---|
| 1.5% | 0% | Liquid product Gel, |
| 3% | 0% | but runs freely on a vertical surface |
| 4% | 0% | Gel formation, but runs on a vertical surface |
| 6% | 0% | Gel, runs slightly on a vertical surface; lump formation |

Layer thickness: 5 mm. All quantities in % by weight
Basic material/catalyst (crude MDI) = 100 pbw/60 pbw Tests were also conducted with varying amounts of Baytec 110, but with no polyamidoamine resin based on oligomerized unsaturated fatty acids. The results are shown in Table 3. Qualitatively, they correspond to the results of tests in which only polyamidoamine resin based on oligomerized unsaturated fatty acids, but no aromatic diamine was added.

Tests were carried out with the same basic materials using various amounts of polyamidoamine resin based on oligomerized unsaturated fatty acids for the same content of Baytec 110 and with the same starting product as in the two previous tests. The results obtained in regard to running behavior on a vertical surface and in regard to the thixotropic effect are shown in Table 4.

In addition, the running behavior was measured for products containing three different concentrations of aromatic diamines and different concentrations of polyamidoamine (Table 5).

TABLE 3

Test for development of pseudoplasticity (Comparison Example)

| Basic material | |
|---|---|
| Castor oil | 50% by weight |
| Fillers | 50% by weight |
| DBTL | 0.13% by weight |
| Baytec 110 | various quantities |
| Polyamidoamine | 0% by weight |

Basic material/catalyst (crude MDI) = 100 parts by weight/20 parts by weight

| Baytec 110 | Pseudoplastic after |
|---|---|
| 3% by weight | 15 s |
| 3.5% by weight | 12 s |
| 4.0% by weight | 9 s |
| 4.5% by weight | 8 s |
| 5.0% by weight | 6 s |
| 6.0% by weight | 5 s |

TABLE 4

Test for pseudoplasticity and running behavior

| Basic material | |
|---|---|
| Castor oil | 50% by weight |
| Fillers | 50% by weight |
| DBTL | 0.13% by weight |
| Baytec 110 | 4.5% by weight |
| Polyamidoamine (see page 4): | various quantities |

Basic material/catalyst (crude MDI) = 100 parts by weight/20 parts by weight

| Polyamidoamine | Pseudoplastic after | Distance run on a* vertical surface |
|---|---|---|
| 0% by weight | 8 s | 3 cm |
| 0.1% by weight | 8 s | 1 cm |
| 0.2% by weight | 7 s | 0.5 cm |
| 0.3% by weight | 6 s | 0.2 cm |
| 0.5% by weight | 5 s | 0 cm |
| 0.75% by weight | 5 s | 0 cm |

*Layer thickness 5 mm

TABLE 5

Test for running behavior on a vertical surface

| | Distance run in cm | | |
|---|---|---|---|
| | % by weight Baytec 110 | | |
| % by weight polyamidoamine, see page 4 | 3.0 | 4.0 | 4.5 |
| 0 | n.d. | 25 | 15 |
| 0.25 | n.d. | | 6 |
| 0.5 | n.d. | | 2 |
| 0.75 | n.d. | | 1.5 |
| 1.0 | n.d. | 5 | |
| 1.2 | n.d. | | 1 |
| 1.5 | n.d. | 3 | 0.2 |
| 2.0 | 25 | 1 | 0 |
| 2.5 | 12 | 0.5 | |
| 2.75* | | 0 | |
| 3.0* | 5 | | |

TABLE 5-continued

Test for running behavior on a vertical surface

| | Distance run in cm | | |
|---|---|---|---|
| | % by weight Baytec 110 | | |
| % by weight polyamidoamine, see page 4 | 3.0 | 4.0 | 4.5 |
| 3.5* | 2 | | |

*Lump formation
0.022% by weight DBTL
Basic material/catalyst (crude MDI) = 100 parts by weight/60 parts by weight
Crude MDI is industrially produced MDI having an average functionality of approximately 2.7.
Layer thickness 5 mm
n.d.: not determined because the systems are not sufficiently thixotropic and hence show such high "distance run" values (>30 cm, in some cases >50 cm) that precise measurement is pointless.

What is claimed is:

1. A polyurethane system comprising a polyol component and a polyisocyanate component resin wherein said polyol component is comprised of a mixture of at least one polyamidoamine and at least one low molecular weight polyfunctional amine.

2. The polyurethane system according to claim 1 wherein said low molecular weight polyfunctional amine is an aromatic amine.

3. The polyurethane system according to claim 1 wherein the weight ratio of said low molecular weight polyfunctional amine to said polyamidoamine is from about 10:1 to about 2:3.

4. The polyurethane system according to claim 3 wherein said weight ratio is from about 2:1 to about 4:1.

5. The polyurethane system according to claim 1 wherein the total of the weight percent of said low molecular weight polyfunctional amine and said polyamidoamine is from about 1% to about 10%.

6. The polyurethane system according to claim 5 wherein said weight percent is from about 2 to about 6%.

7. The polyurethane system according to claim 1 wherein said low molecular weight polyfunctional amine is a diamine.

8. The polyurethane system according to claim 7 wherein said diamine is a cycloaliphatic diamine.

9. The polyurethane system according to claim 7 wherein said diamine is polyoxypropylene α,ω-diamine.

10. The polyurethane system according to claim 1 wherein said low molecular weight polyfunctional amine is an alkanolamine which is a liquid at room temperature.

11. The polyurethane system according to claim 1 wherein said low molecular weight polyfunctional amine is tetramethyl ethylenediamine.

12. The polyurethane system according to claim 1 wherein said low molecular weight polyfunctional amine is an aromatic diamine.

13. The polyurethane system according to claim 12 wherein said aromatic diamine is 2,4-diaminomesitylene; 1,3,5-triethyl-2,4-diaminobenzene; 1,3,5-triisopropyl-2,4-diaminobenzene; 4,6-dimethyl-2-ethyl-1,3-diaminobenzene; 3,5,3',5'-tetraethyl-4,4'-diaminodiphenylmethane; 3,5,3',5'-tetraisopropyl-4,4'-diaminodiphenylmethane; 3,5-diethyl-3',5'-diisopropyl-4,4'-diaminodiphenylmethane; 1-t-butyl-3,5-dimethyl-2,4-diaminobenzene; 1-t-butyl-3,5-dimethyl-2,6-diaminobenzene.

14. The polyurethane system according to claim 12 wherein said aromatic diamine is a trialkyl-substituted diaminobenzene.

15. The polyurethane system according to claim 14 wherein said trialkyl-substituted diaminobenzene is a mixture of isomers having one methyl and two ethyl groups.

16. The polyurethane system according to claim 15 wherein said mixture of isomers is comprised of 1-methyl-3,5-diethyl-2,4-diaminobenzene; 1-methyl-3,5-diethyl-2,2-diaminobenzene; or a combination thereof.

17. The polyurethane system according to claim 1 wherein said polyamidoamine is the reaction product of an oligomerized fatty acid and an excess of a polyfunctional amine.

18. The polyurethane system according to claim 17 wherein said oligomerized fatty acid is a trimmer fatty acid.

19. The polyurethane system according to claim 1 wherein said polyamidoamine is the reaction product of an oligocarboxylic acid obtained from the oligomerization of an unsaturated fatty acid wherein said oligocarboxylic acid is comprised of at least 50% by weight of trimmer fatty acid, from about 10% to about 50% by weight of dimer fatty acid, and from 0 to about 2% by weight of monomeric fatty acid with an excess of heterocyclic diamine of the formula

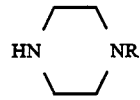

wherein R is hydrogen, or R'NH$_2$ wherein R' is a saturated aliphatic hydrocarbon chain.

20. The polyurethane system according to claim 19 wherein said aliphatic hydrocarbon chain is a —C$_2$H$_4$— group.

21. The polyurethane system according to claim 1 wherein the said polyamidoamine has an average molecular weight of about 1,200 and an empirical formula of C$_{72}$H$_{150}$N$_9$O$_3$.

22. The polyurethane system according to claim 1 wherein the said polyamidoamine has a viscosity of about 3,000 Pa at 25° C.

23. A process for producing a polyurethane comprising the steps of: (1) adding a polyfunctional amine and a polyamidoamine to a polyol to form a polyol component; (2) mixing said polyol component and an isocyanate component.

* * * * *